(12) United States Patent
Shapiro et al.

(10) Patent No.: US 6,243,714 B1
(45) Date of Patent: *Jun. 5, 2001

(54) CO-PRESENCE DATA RETRIEVAL SYSTEM

(75) Inventors: Ehud Shapiro, New York, NY (US); Avner Shafrir; Jacob Rimer, both of Rehovot (IL)

(73) Assignee: Ubique Ltd., Rehovot (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/071,873

(22) Filed: May 1, 1998

Related U.S. Application Data

(63) Continuation-in-part of application No. 08/827,845, filed on Apr. 11, 1997, now Pat. No. 5,819,084.

(51) Int. Cl.⁷ .................................................. G06F 12/00
(52) U.S. Cl. ................................ 707/201; 707/8; 707/10; 709/203
(58) Field of Search ............................... 707/1, 4, 8, 10, 707/201; 709/101, 203

(56) References Cited

U.S. PATENT DOCUMENTS

| | | | |
|---|---|---|---|
| 4,775,934 | 10/1988 | Houri et al. | 364/300 |
| 5,008,853 | 4/1991 | Bly et al. | 364/900 |
| 5,159,669 | 10/1992 | Trigg et al. | 395/159 |
| 5,220,657 | 6/1993 | Bly et al. | 395/425 |
| 5,222,221 | 6/1993 | Houri et al. | 395/375 |
| 5,388,196 | 2/1995 | Pajak et al. | 395/153 |
| 5,408,470 | 4/1995 | Rothrock et al. | 370/62 |
| 5,452,299 | 9/1995 | Thessin et al. | 370/62 |
| 5,511,196 | 4/1996 | Shackelford et al. | 395/700 |
| 5,625,809 | 4/1997 | Dysart et al. | 395/614 |
| 5,634,124 | 5/1997 | Khoyi et al. | 395/614 |

FOREIGN PATENT DOCUMENTS

2289149A * 11/1995 (GB) ............................ G06F/17/30

OTHER PUBLICATIONS

Dotson et al, "Synthetic Environment Tactical Integration Virtual Torpedo Project", Oceans '97. MTS/IEEE Conference Proceedings, pp. 1431, 1434, Oct. 1997.*

Gross et al, "Computer–Supported Cooperative Work and the Internet", Proceedings of Seventh International Conference and Workshop on Database and Expert Systems Applications, pp. 425–430, IEEE 09–10 Sep. 1996.*

Whittaker et al, "Co–ordinating Activity: an Analysis of Interaction in Computer–Supported Co–Operative Work", CHI'91, Conference Proceedings, pp. 361–367, May 1991.*

(List continued on next page.)

Primary Examiner—Wayne Amsbury
Assistant Examiner—Uyen Le
(74) Attorney, Agent, or Firm—Eitan, Pearl, Latzer & Cohen-Zedek

(57) ABSTRACT

A data retrieval system is described. The system includes a data server, at least one data retrieval client, a co-presence server and at elast one downloadable co-presence client. The data server retrieves at least one data object from among a plurality of data objects stored in a data repository. The data retrieval client requests at least one data object from the data server. The co-presence server includes a virtual place generator which generates one virtual place per data object retrieved from the data server and an associator which associates each virtual place with its data object once its data object is accessed. The downloadable co-presence client is operative with the data retrieval client and communicates with the co-presence server. Each co-presence client includes an object associator which associates a data object received from the co-presence server with one of the at least one virtual places in the co-presence server.

3 Claims, 6 Drawing Sheets

OTHER PUBLICATIONS

Leigh et al, Supporting Transcontinental Collaborative Work in Persistent Virtual Environments, IEEE Computer Graphics and Applications, vol 16. No. 4, pp. 47–51, Jul. 1996.*

Masinter et al., "Collaborative Information Retrieval: Gopher from MOO", Proc. INET '93, pp. DFA–1 –DFA–9.

"Frequently Asked Questions: Basic Information about MUDs and MUDding", Jun. 14, 1993.

Mark Clarkson, Welcome to my fantasy—a personal tour through "shared consensual hallucinations" on the Internet, pp. 36–39, Computer Gaming World, V123, Oct. 1994.

* cited by examiner

CO-PRESENCE DATA RETRIEVAL SYSTEM

CROSS-REFERENCE TO RELATED APPLICATIONS

This application is a continuation-in-part of U.S. Ser. No. 08/827,845, filed Apr. 11, 1997, now U.S. Pat. No. 5,819,084.

FIELD OF THE INVENTION

The present invention relates to data retrieval systems generally and to data retrieval systems with co-presence mechanisms in particular.

BACKGROUND OF THE INVENTION

Data retrieval systems are known in the art. A typical one is shown in FIG. 1 to which reference is now made. Data retrieval systems typically consist of a data server 10 and multiple data-retrieval clients 12 which are typically separate computers. Upon command of a data-retrieval client 12, the data server 10 accesses a data repository 14, or database, that contains data objects 16 therein. Data objects 16 are typically files of information. The data-retrieval clients 12 also communicate with a user 17, typically through an interactive display 18.

A typical data retrieval operation depicted in FIG. 2 to which reference is now made, proceeds as follows: upon receipt of an instruction (arrow 1) from the user 17 to retrieve a certain data object 16, the data-retrieval client 12 sends (arrow 2) a request to the data server 10 on which the object resides. The data server 10 retrieves the requested data object 16 (arrow 3) from the data repository 14 and sends the object 16 back (arrow 4) to the data-retrieval client 12. The data-retrieval client 12 then displays (arrow 5) the retrieved data object 16 to the user 17.

Additional features incorporated in a data retrieval system may include a data-management mechanism that allows a data-retrieval client 12 to create a new data object 16, to modify a retrieved data object 16 and to send the created or modified data object 16 back to the data server 10 for storage in the data repository 14, and a permission mechanism that allows the server 10 to approve or deny certain client requests.

Examples of data retrieval systems, some of which include the additional features, include the file transfer protocol (FTP), hypertext transfer protocol (HTTP), Gopher and network file systems (NFS) standards, network news servers (NNTP), DEC Notes of Digital Electric Corporation of the USA, Lotus Notes of Lotus Inc. of the USA, Novell NetWare of Novell Inc. of the USA, and the relational database management systems (RDBMS) such as those manufactured by Oracle, Sybase, and Informix, all of the USA.

SUMMARY OF THE PRESENT INVENTION

There is provided, in accordance with a preferred embodiment of the present invention, a data retrieval system including a data server, at least one data retrieval client and a co-presence server. The data server retrieves at least one data object from among a plurality of data objects stored in a data repository. Each data retrieval client requests at least one data object from the data server. The co-presence server includes a unit for generating one virtual place per data object retrieved from the data server, a unit for associating each virtual place with its data object once its data object is accessed and at least one downloadable co-presence client, operative with the data retrieval client, for communicating with the data server. Each co-presence client includes an object association unit for associating a data object received from the co-presence server with one of the at least one virtual places in the co-presence server.

Additionally, in accordance with a preferred embodiment of the present invention, the downloadable co-presence client is implemented in one of the following languages: Java and ActiveX.

Finally, the object association unit includes apparatus for moving to a new virtual place.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Figure 3:
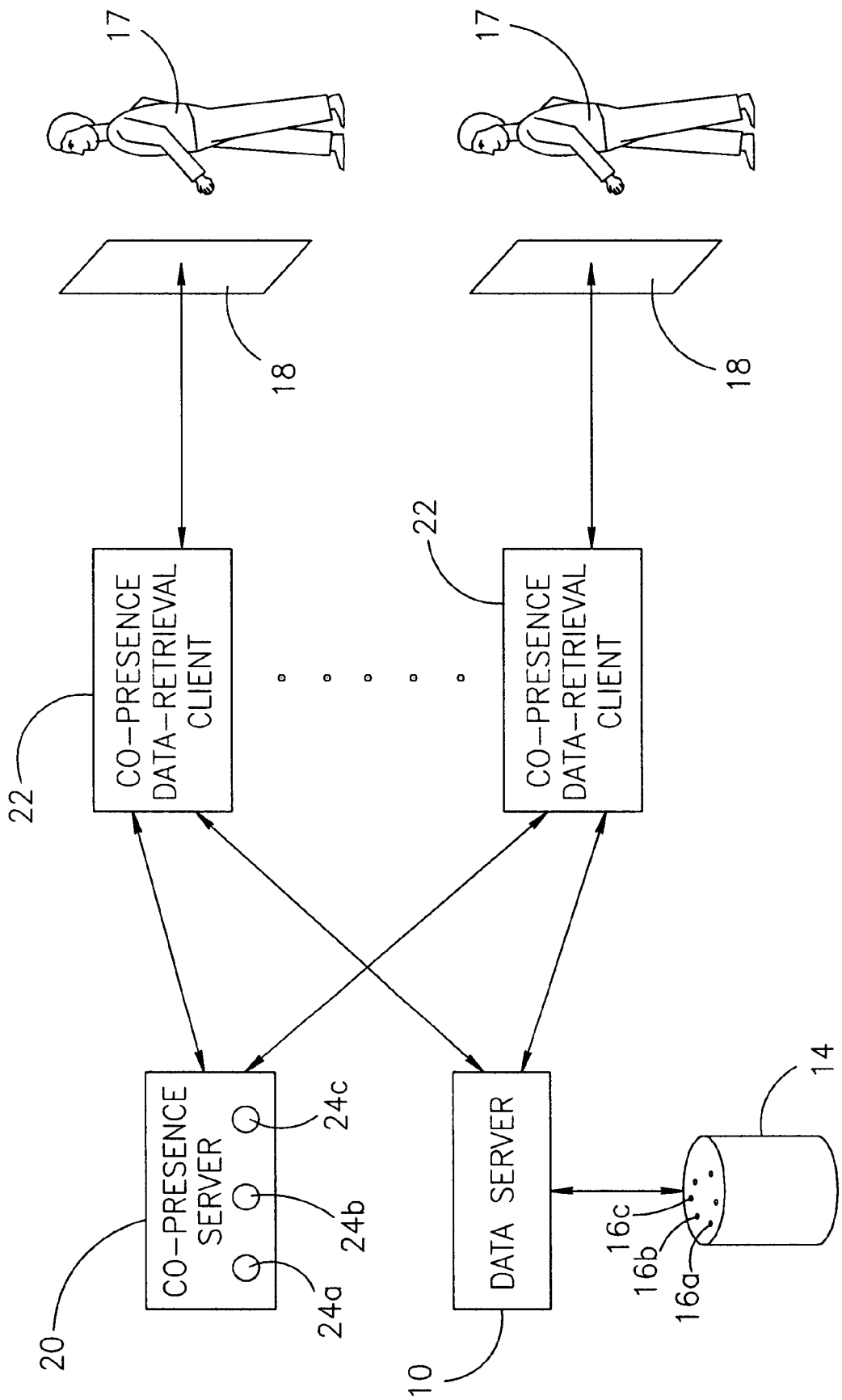
FIG. 3 is a schematic illustration of a data retrieval system with a co-presence server, constructed and operative in accordance with a first preferred embodiment of the present invention.
Figure 4:
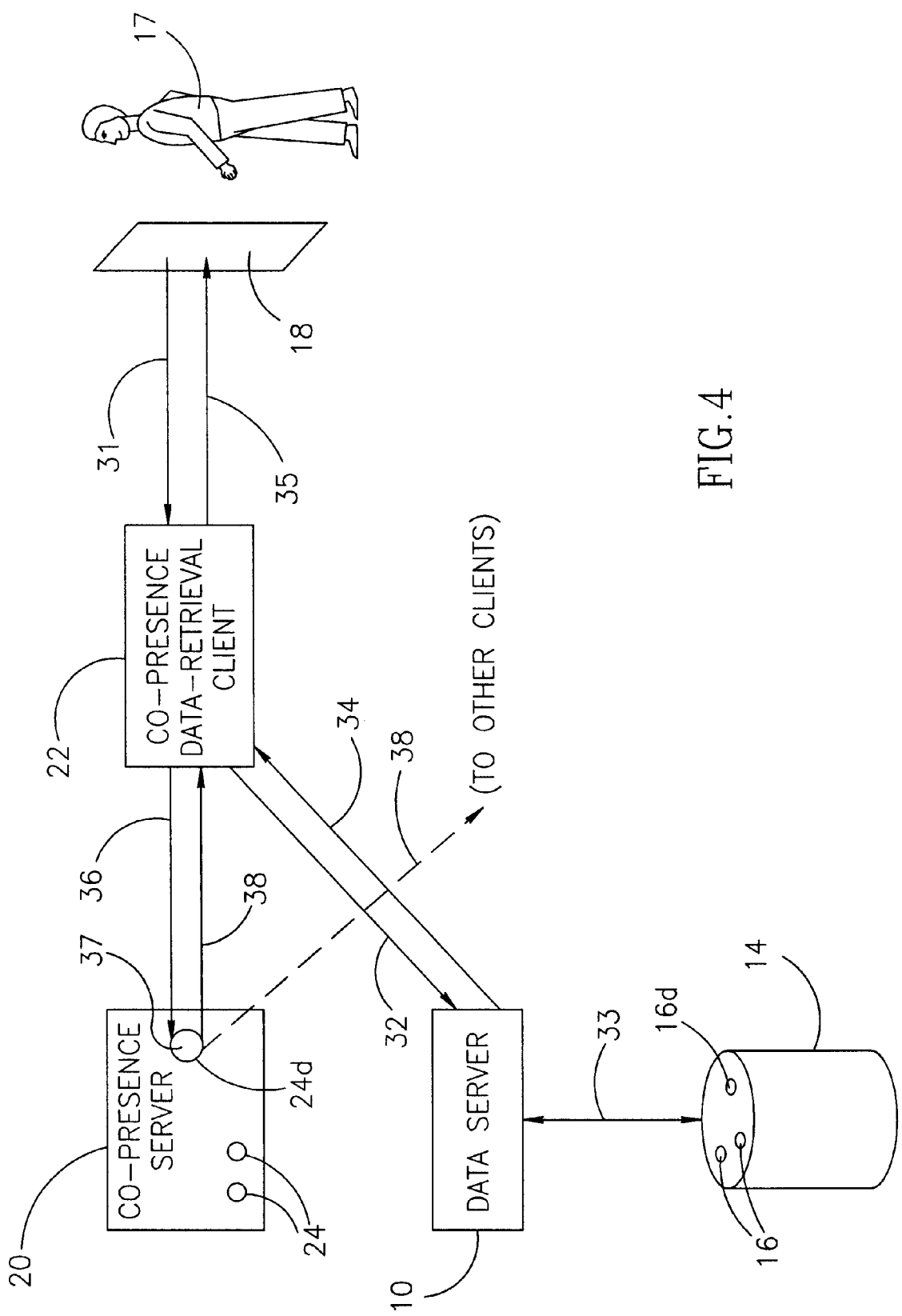
FIG. 4 is a schematic illustration of a co-present data retrieval operation.

Reference is now made to FIGS. 3 and 4 which illustrate the data-retrieval system of the present invention. The system of the present invention typically comprises data server 10 and data repository 14 as in the prior art. It also comprises, in accordance with a preferred embodiment of the present invention, a co-presence server 20 and a multiplicity of co-presence data-retrieval clients 22 each communicating with data server 10, co-presence server 20, and, through the associated display 18, with a user 17.

As in the prior art, each data-retrieval client 22 requests a data object 16 through the data server 10 which retrieves the requested data object 16 from the data repository 14. In addition, in accordance with a preferred embodiment of the present invention, at the same time, the co-presence data-retrieval client 22 also informs the co-presence server 20 that it has retrieved a specific data object 16, for example object 16a. In response, the co-presence server 20 adds the data-retrieval client 22 to a virtual place 24 associated with the retrieved data object 16a. Client 22 associates virtual places 24a–24c with retrieved data objects 16a–16c.

For the purposes of clarity of discussion, we will state that the co-presence server 20 maintains a virtual place 24 for each data object 16 stored in the data server 10. It will be appreciated that the co-presence server 20 can also create a virtual place 24 on demand, when the first user becomes present at the data object 16, and can remove the virtual place 24 when no one is present.

All users which access a data object 16 via data-retrieval client 22 are added to the virtual place 24 associated with the data object 16 that they accessed. In addition, co-presence server 20 provides each virtual place 24 with inter-user communication capabilities such that any user which accesses a data object 16 can communicate, if he so desires, with the other users which are currently utilizing the same data object 16. The co-presence server 20 allows a user 17 who is present at a data object 16 to become aware of other co-present users 17 and provides a means for co-present users 17 to communicate with each other in real time. The communication between users 17 can also be client-to-client if communication through the co-presence server 20 is slow.

The co-presence server 20 essentially turns each data object into a virtual place where users 17 can meet to view the data object 16, to modify it, and to discuss it. For example, if a data server 10 contains user manuals for a certain product then it might be useful for the product's vendor to place a help-desk person at the virtual place, or places, associated with the user manuals. The help-desk person can then assist, in real-time, those users who access the user manuals, if they need additional assistance or have difficulties "finding their way" through the product's documentation.

The co-presence server 20 and the co-presence data-retrieval client 22 follow a co-presence protocol which is illustrated with arrows 31–38 of FIG. 4.

Figure 1:
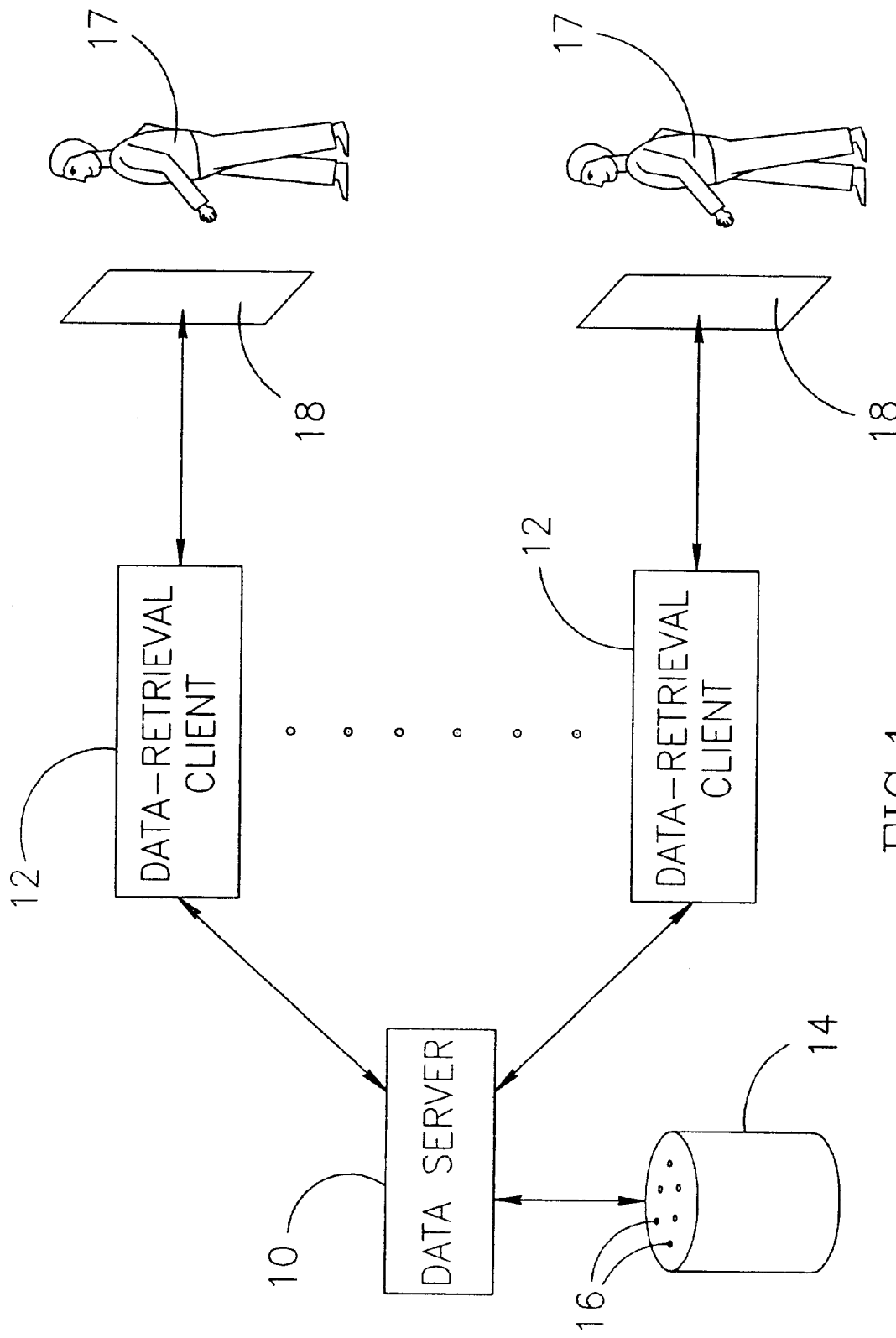
FIG. 1 is a schematic illustration of a prior art data retrieval system.
Figure 2:
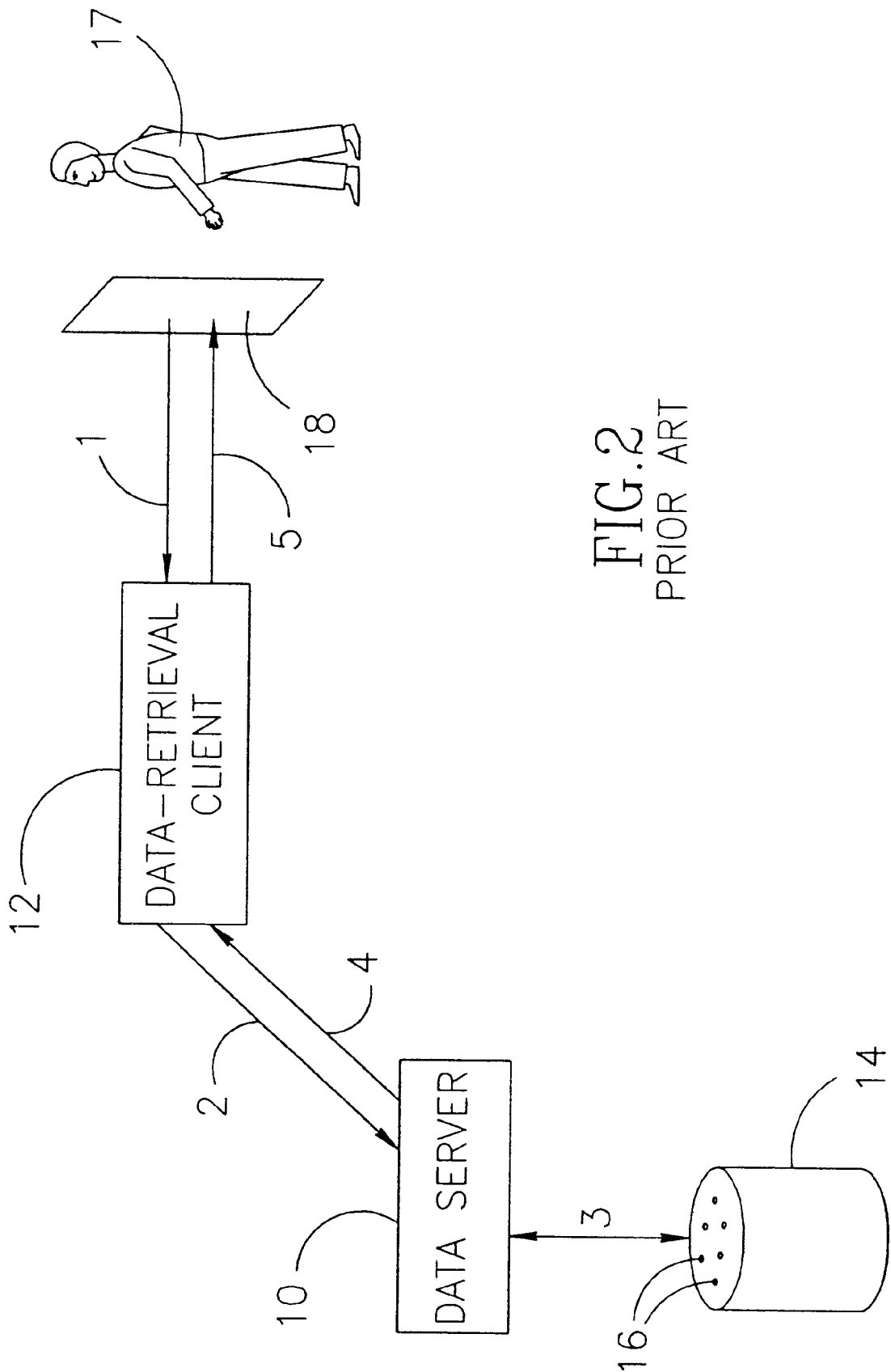
FIG. 2 is a schematic illustration of one prior art data retrieval operation.

A user 17 retrieves a data object 16d from a certain data server 10 in accordance with the protocol described in the prior art (arrows 31–35, similar to arrows 1–5 of FIG. 2). At the same time, the co-presence data-retrieval client 22 sends (arrow 36) a message to virtual place 24d within the co-presence server 20 which is associated with the data object 16d, to the effect that the user has accessed the data object 16d. (Typically, the data objects 16 have well-defined names on the data server 10. Clients 22 utilize the same or corresponding names to identify the corresponding virtual places 24). The virtual place 24d then adds (step 37) the user to the list of co-present users, and sends a message (arrow 38) to that effect to all co-present users, including to the user which just joined the virtual place 24d.

When a user 17 present at a data object 16 wishes to send a message to selected ones of the co-present users 17, the first user 17 sends a message to that effect, via co-presence data-retrieval client 22 and the co-presence server 20, to the associated virtual place 24 which, in turn, relays the message to the selected users 17 present at the data object 16.

When a user 17 ceases to be present at a data object 16 (either due to the retrieval of another data object 16 from the same or another data server 10 or due to closure of its co-presence data-retrieval client 22), the co-presence data-retrieval client 22 sends a message (arrow 36) to that effect to the virtual place 24 which, in turn, deletes the user 17 from the list of co-present users. Virtual place 24 then sends a message (arrow 38) to all remaining co-present users 17 notifying them of the event.

The co-presence protocol can be described by the operations performed by the co-presence data-retrieval client 22 and by the co-presence server 20 and virtual place 24. The following pseudocode describes the protocol:

For the client 22 of user U:
Assume user U already has document D1 from server S1.
When user U requests document D2 from server S2:
1. Attempt to retrieve document D2 from server S2;
2. If the retrieval is successful, send the following message to the virtual place P(D1) in co-presence server C(S1) corresponding to document D1: "U left for virtual place D2 in server S2".

When user U requests to say text T:
send the message "U said T" to the co-presence server C(S2).
Upon receipt of message7 "User V entered (or left) for (from) virtual place P(Dj) in server Sk":
display to user U the current list of users in the virtual place.
Upon receipt of the message "V said T":
display to user U the message "V said T".
For the virtual place P(Di) on co-presence server C(Si)
Let the set of co-present users be CP:
Upon receipt of message "U left for virtual place P(Dj) in server Sk:
1. Delete user U from the set CP of co-present users
2. Send to every remaining user V in CP the message: "U left for virtual place P(Dj) in server Sk
Upon receipt of the message "U entered from virtual place P(Dj) in server Sk:
1. Add user U to the set CP of co-present users
2. Send to every user V in the set CP of co-present users the message "U entered from virtual place P(Dj) in server Sk.
Upon receipt of message "U said T"
Send the message "U said T" to every user in the set CP of co-present users, The co-presence server 20 can be implemented in any way which provides co-presence. In one embodiment, the co-presence server 20 is implemented as a Unix process, executing a concurrent programming language called flat concurrent Prolog (FCP). Using an FCP internal light-weight process mechanism, as described in U.S. Pat. No. 5,222,221 to Houri et al. which is hereby incorporated by reference, each virtual place 24 can be implemented as a place process, each formed of a collection of FCP processes. Each FCP process obeys the co-presence protocol described hereinabove.

The co-presence server 20 receives communications on a pre-assigned and published port whose identity is incorporated in the co-presence data-retrieval client 22. The co-presence server 20 typically receives messages from the co-presence data-retrieval clients 22 and provides them to the appropriate virtual place 24. In addition, if desired, the managing Unix process (the co-presence server 20) can also create a featherweight process (virtual place 24) whenever a first user accesses a data object 16 and can remove a process whenever there cease to be users co-present at the relevant virtual place 24.

It will be appreciated that, because communication with the co-presence server 20 is separate from the data-retrieval operations, the data-retrieval system of the present invention can operate with standard data-retrieval clients 12 which do not have any co-presence capability.

It will further be appreciated that the system of the present invention can easily be created from an existing prior art data-retrieval system. The upgrading process involves adding a co-presence server 20, as described hereinabove, and modifying the data-retrieval clients 12 to become co-presence data-retrieval clients 22 through the addition of the following capabilities:

a) the ability to open an additional communication channel with the co-presence server 20;
b) the ability to map data objects 16 to virtual places 24;
c) the ability to display co-presence information;
d) the ability to enable users 17 to communicate in real time; and
e) the ability to notify the co-presence server 20 when the client 22 is terminated or closed down.

It will be appreciated that data-retrieval clients which have not been upgraded can still operate within the data-retrieval system of FIGS. 3 and 4.

Figure 5:
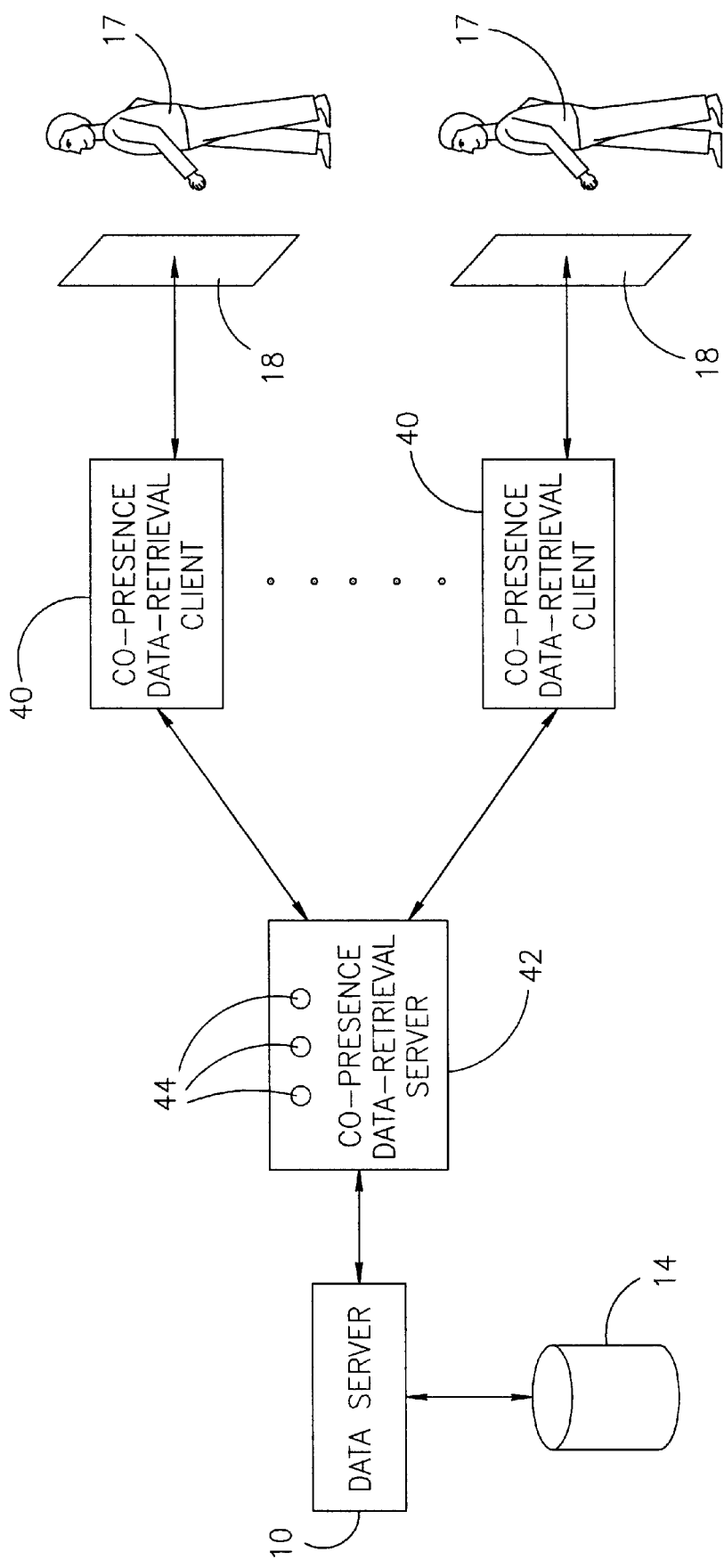
FIG. 5 is a schematic illustration of an alternative embodiment of a co-present data-retrieval system and its operation.

Reference is now made to FIG. 5 which illustrates an alternative embodiment of the present invention. In this embodiment, the data-retrieval system comprises the same elements but they are configured in a different manner. Specifically, the data-retrieval system comprises co-presence data-retrieval clients, labeled 40, and a co-presence data-retrieval server 42, as well as data server 10 and data repository 14 as in the prior art.

In this alternative embodiment, the co-presence data-retrieval clients 40 communicate only with the co-presence data-retrieval server 42, providing to it their data retrieval requests, which the server 42, in turn, passes to the data server 10, and their co-presence communication. The co-presence data-retrieval server 42 includes virtual places 44. There can also be many servers 42, each of which handles data retrieval requests for its associated data server 10.

The following is a pseudo code describing the protocol between clients 40 and server 42:

For client 42 of user U:
Assume user currently has document D1 in server S1.
When user requests document D2 from server S2:
 1. Send message "U requests to enter from place P(D1) in server S1" to place P(D2) in co-presence server C(S2)
 2. If data-retrieval is successful, send the message "U Left for place P(D2) in server S2" to place P(D1) in co-presence server C(S1)
When user U requests to say text T:
 Send the message "U said T" to the co-presence server C(S2)
Upon receipt of message "V entered (left) for (from) place Dj in server Si":
 Display to the user U the current co-present users in the place P(Dj)
Upon receipt of message "V said T":
 Display to the user U the message from user V.
For the virtual place P(Di) on co-presence server C(Si)
Let the set of co-present users be CP:
Upon receipt of message "U left for virtual place P(Dj) in server Sk":
 1. Delete user U from the set CP of co-present users
 2. Send to every remaining user V in CP the message: "U left for virtual place P(Dj) in server Si"
Upon receipt of the message "U requests to enter from virtual place P(Dj) in server Sk":
 1. Attempt to retrieve data from data server 10
 2. If successful:
  a. Send the data to client 42 of user U
  b. Add user U to the set CP of co-present users
  c. Send to every user V in the set CP of co-present users the message "U entered from virtual place P(Di) in server Si".
Upon receipt of message "U said T"
 Send the message "U said T" to every user in the set CP of co-present users.

Figure 6:
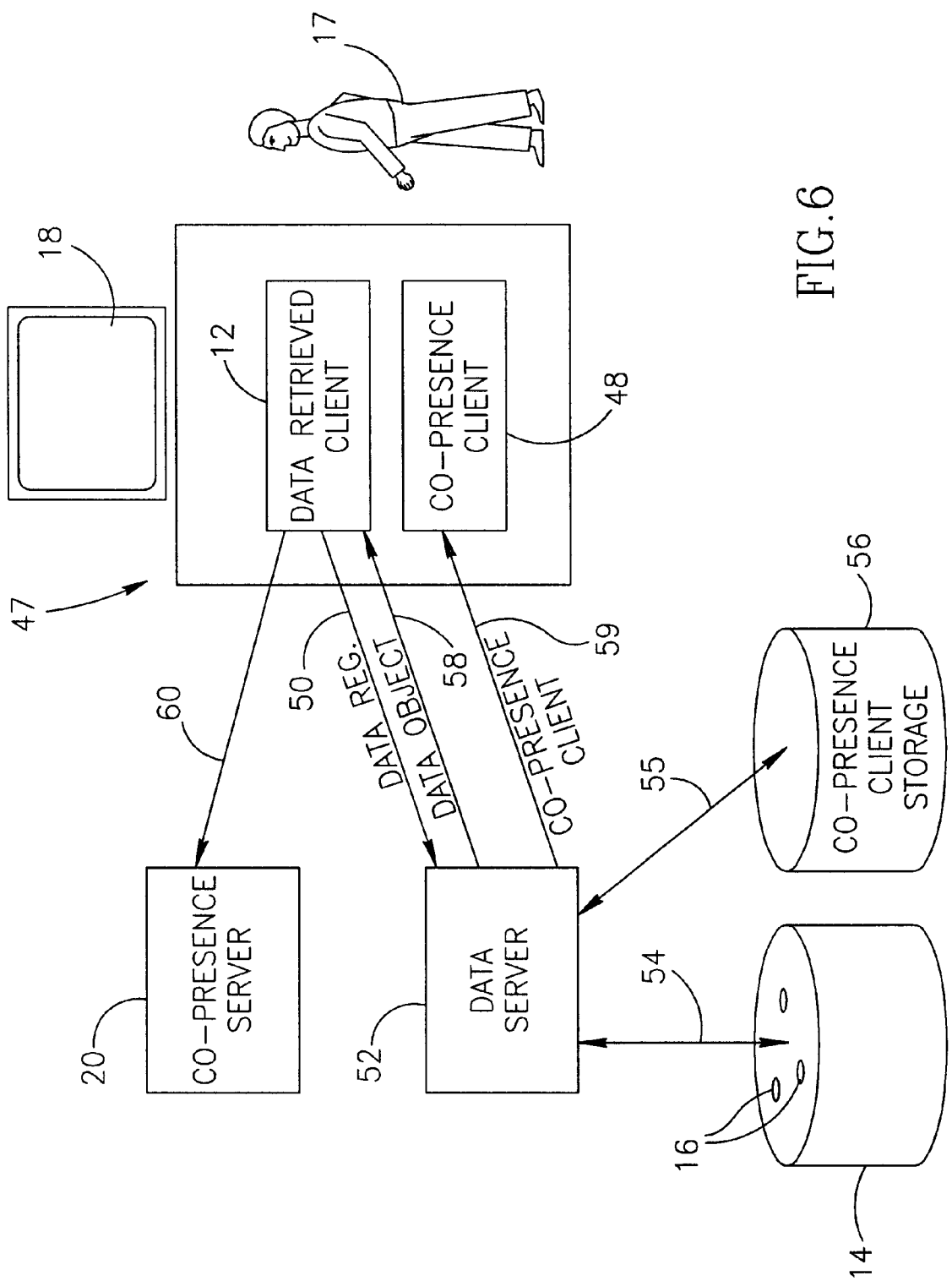
FIG. 6 is a schematic illustration of a further alternative embodiment of a co-present data-retrieval system and its operation.

In the previous embodiments, the co-presence data retrieval client had to be present on a user's machine prior to retrieving any data objects. Reference is now made to FIG. 6 which illustrates an alternative embodiment of the present invention in which the co-presence client is retrieved.along with the data object.

In this embodiment, the data retrieval and co-presence operations are divided. Thus, the user's machine, labeled 47, includes a standard, data retrieval client, such as client 12 of the prior art, co-presence clients 48 which can operate with the data retrieval clients 12 and display 18.

Initially, the user 17 communicates with the data retrieval client 12. Upon request, the data retrieval client 12 sends (arrow 50) a data request to the data server 52 which, in response, accesses (arrow 54) the data repository 14. In addition, the data server 52 accesses (arrow 55) a separate repository 56 in which a co-presence client 48 is stored. Data server 52 provides both the retrieved data object 16 and the co-presence client 48 to the user's machine 47 which, in turn, provides the data object 16 to the data retrieval client 12 and downloads the co-presence client 48 to operate with the data retrieval client 12.

Once the co-presence client is downloaded on the user's machine, the combination of the data retrieval client 12 and the co-presence client implements the co-presence data retrieval client of the previous embodiments. Once downloaded, the co-presence client informs (arrow 60) the co-presence server 22 that the user has retrieved the relevant data object 16. The remaining operations are as described hereinabove for the previous embodiments.

The co-presence client can be written in any of a number of automatically downloading languages, such as Java and ActiveX, and the data retrieval client is typically a Web Browser or any other Java or ActiveX container.

The co-presence client can be retrieved with every data object or it can remain on the user's machine. For a co-presence client written in Java, the client remains active until the Web Browser is closed. For a co-presence client written in ActiveX, the client remains permanently downloaded on the user's machine.

It will be appreciated by persons skilled in the art that the present invention is not limited to what has been particularly shown and described hereinabove. Rather the scope of the present invention is defined by the claims which follow:

What is claimed is:
1. A data retrieval system comprising:
 a data server for retrieving at least one data object from among a plurality of data objects stored in a data repository;
 at least one data retrieval client for requesting at least one data object from said data server;
 a co-presence server including:
  means for generating one virtual place per data object retrieved from said data server; and
  means for associating each virtual place with its data object once its data object is accessed; and
  means for downloading at least one co-presence client, said downloading means operable in response to said at least one data object being retrieved, said at least one co-presence client operative with said data retrieval client, for communicating with said data server, said at least one co-presence client including object association means for associating a data object received from said co-presence server with one of said at least one virtual place in said co-presence server.
2. A system according to claim 1 and wherein said co-presence client is implemented in one of the following languages: Java and ActiveX.
3. A data retrieval system according to claim 1 and wherein said object association means comprises means for moving to a new virtual place.

* * * * *